(12) United States Patent
Wu et al.

(10) Patent No.: US 12,544,914 B2
(45) Date of Patent: Feb. 10, 2026

(54) WELDING SYSTEM AND SPOT CHECK METHOD FOR WELDING SYSTEM

(71) Applicant: Contemporary Amperex Technology Co., Limited, Ningde (CN)

(72) Inventors: Kai Wu, Ningde (CN); Zhiyong Jing, Ningde (CN); Jun Zhao, Ningde (CN); Shaolin Chen, Ningde (CN); Ying Wu, Ningde (CN); Genli Song, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 17 days.

(21) Appl. No.: 18/795,222

(22) Filed: Aug. 6, 2024

(65) Prior Publication Data

US 2025/0114935 A1    Apr. 10, 2025

Related U.S. Application Data

(63) Continuation of application No. PCT/CN2023/139624, filed on Dec. 18, 2023.

(30) Foreign Application Priority Data

Oct. 8, 2023    (CN) .......................... 202311289509.8

(51) Int. Cl.
*B25J 9/16*    (2006.01)
*B23K 26/08*    (2014.01)
(Continued)

(52) U.S. Cl.
CPC ........... *B25J 9/161* (2013.01); *B23K 26/0869* (2013.01); *B23K 26/21* (2015.10); *B25J 9/1653* (2013.01);
(Continued)

(58) Field of Classification Search
CPC ........ B25J 9/161; B25J 9/1653; B25J 9/1664; B25J 11/005; B25J 13/06; B25J 15/0019;
(Continued)

(56) References Cited

U.S. PATENT DOCUMENTS 10,434,593 B2 * 10/2019 Nishimura ............. B23K 9/124
2011/0278265 A1 * 11/2011 Kessler .................. B23K 26/21
219/121.62

(Continued)

FOREIGN PATENT DOCUMENTS

CN    113305424 A    8/2021
CN    114749797 A    7/2022
(Continued)

OTHER PUBLICATIONS

First Office Action received in the corresponding Chinese Application 202311289509.8, mailed on Nov. 18, 2023.
(Continued)

*Primary Examiner* — Sohana Tanju Khayer
(74) *Attorney, Agent, or Firm* — K&L Gates LLP

(57) ABSTRACT

Provided are a welding system and a spot check method for a welding system. The welding system includes a controller, a human-machine interface, and a welding device. The spot check method for a welding system includes: controlling a rangefinder in a welding device to perform ranging, along a first direction, of at least two posts in a battery product to be welded, so as to obtain a set of ranging values between the at least two posts and the rangefinder, the first direction being parallel to an optical axis of a laser galvanometer in the welding device, the rangefinder being calibrated based on a first position in the first direction, the first position being a position of a focal point of the laser galvanometer in the first direction, and the rangefinder being at a fixed distance from the laser galvanometer in the first direction.

20 Claims, 4 Drawing Sheets

(51) Int. Cl.
  *B23K 26/21* (2014.01)
  *B25J 11/00* (2006.01)
  *B25J 13/06* (2006.01)
  *B25J 15/00* (2006.01)
  *B23K 101/38* (2006.01)

(52) U.S. Cl.
  CPC ........... *B25J 9/1664* (2013.01); *B25J 11/005* (2013.01); *B25J 13/06* (2013.01); *B25J 15/0019* (2013.01); *B23K 2101/38* (2018.08)

(58) Field of Classification Search
  CPC ................ B23K 26/0869; B23K 26/21; B23K 2101/38; B23K 26/032; B23K 26/082; B23K 26/702; B23K 2101/36
  See application file for complete search history.

(56) References Cited

U.S. PATENT DOCUMENTS

| | | | | |
|---|---|---|---|---|
| 2013/0105557 A1* | 5/2013 | Spicer | ................. | H01M 50/536 228/104 |
| 2014/0061169 A1* | 3/2014 | Sammons | ............ | B23K 9/1006 219/109 |
| 2016/0267806 A1* | 9/2016 | Hsu | ...................... | B23K 9/0956 |
| 2017/0032281 A1* | 2/2017 | Hsu | ........................ | G06Q 10/06 |
| 2018/0043453 A1* | 2/2018 | Yamasaki | ............ | B23K 9/1081 |
| 2018/0111327 A1* | 4/2018 | Watanabe | ............ | B29C 66/114 |
| 2019/0329356 A1* | 10/2019 | Zhang | .................. | B23K 26/032 |
| 2020/0114467 A1* | 4/2020 | Nogami | ............ | B23K 26/0861 |
| 2020/0331061 A1* | 10/2020 | Redding | ................ | B33Y 30/00 |
| 2020/0368904 A1* | 11/2020 | Aldridge | ............. | B23K 9/0953 |
| 2021/0138646 A1* | 5/2021 | Matsushima | .......... | B25J 9/1684 |
| 2021/0310962 A1* | 10/2021 | Oetiker | .................. | G05D 1/024 |
| 2022/0088709 A1* | 3/2022 | Wang | .................... | B23K 26/082 |
| 2022/0357294 A1* | 11/2022 | Joung | ................ | H01M 10/4285 |
| 2023/0381886 A1* | 11/2023 | Lee | ....................... | B23K 20/106 |
| 2024/0139874 A1* | 5/2024 | Bailey | .................... | B23K 26/70 |
| 2024/0154884 A1* | 5/2024 | Jain | .......................... | H04L 43/02 |
| 2024/0253165 A1* | 8/2024 | Liu | .................... | B23K 26/0096 |
| 2024/0408699 A1* | 12/2024 | Jang | ........................ | B23K 26/21 |
| 2025/0018500 A1* | 1/2025 | Holliman | .............. | B08B 7/0042 |
| 2025/0033144 A1* | 1/2025 | Lee | ....................... | B23K 31/125 |
| 2025/0093827 A1* | 3/2025 | Ushioda | ................... | G06N 7/01 |
| 2025/0205818 A1* | 6/2025 | Melancon | .............. | B23K 26/21 |

FOREIGN PATENT DOCUMENTS

| | | | |
|---|---|---|---|
| CN | 114951992 | A * | 8/2022 |
| CN | 115255626 | A | 11/2022 |
| CN | 116571903 | A | 8/2023 |
| CN | 117020457 | A | 11/2023 |
| JP | 2011173170 | A | 9/2011 |
| KR | 20030077757 | A | 10/2003 |
| WO | 2018040912 | A1 | 3/2018 |

OTHER PUBLICATIONS

Notification to Grant Patent Right for Invention received in the corresponding Chinese Application 202311289509.8, mailed on Dec. 3, 2023.

International Search Report received in the corresponding international application PCT/CN2023/139624, mailed on Jun. 29, 2024.

Written Opinion of ISA received in the corresponding international application PCT/CN2023/139624, mailed on Jun. 29, 2024.

\* cited by examiner

WELDING SYSTEM AND SPOT CHECK METHOD FOR WELDING SYSTEM

CROSS-REFERENCE TO RELATED APPLICATION

The present disclosure is a continuation of International Application No. PCT/CN2023/139624, filed on Dec. 18, 2023, which claims priority to Chinese patent application No. 202311289509.8, filed on Oct. 8, 2023 and entitled "WELDING SYSTEM AND SPOT CHECK METHOD FOR WELDING SYSTEM", and claims the priority of the Chinese Patent Application, the entire content of which is incorporated herein by reference.

TECHNICAL FIELD

The present disclosure relates to, without limitation, the field of welding technologies for battery products, and in particular, to a welding system and a spot check method for a welding system.

BACKGROUND ART

New energy batteries are increasingly widely applied in life and industry, for example, new energy vehicles equipped with the batteries have been used widely. In addition, batteries are also increasingly applied in the field of energy storage, etc.

In a process of producing a battery product, the welding of posts is a very important step, which allows a plurality of battery cells in the battery product to be electrically connected using busbars in a cell connection system (CCS). However, during the welding of the posts, due to an inappropriate distance between a laser galvanometer and a post in the battery product to be welded, it may lead to a poor welding quality, affecting a product yield.

SUMMARY OF THE INVENTION

In view of this, embodiments of the present disclosure provide at least a welding system and a spot check method for a welding system, which can facilitate a user in performing management and control of a distance between a laser galvanometer and a post in a battery product to be welded, thus improving a welding quality of the battery product and increasing a product yield.

The technical solutions of the embodiments of the present disclosure are implemented as follows.

An embodiment of the present disclosure provides a welding system, including: a controller, a human-machine interface, and a welding device, where the controller is configured to: determine a pre-weld ranging parameter for a battery product to be welded, based on a set of ranging values between at least two posts in the battery product and a rangefinder in the welding device; and send the pre-weld ranging parameter and a current effective parameter management-control condition to the human-machine interface, the parameter management-control condition being used for verifying the pre-weld ranging parameter;

the human-machine interface is configured to: display the pre-weld ranging parameter and the parameter management-control condition; and the welding device is configured to: perform ranging of the at least two posts along a first direction using the rangefinder, to obtain the set of ranging values, the first direction being parallel to an optical axis of a laser galvanometer in the welding device, the rangefinder being calibrated based on a first position in the first direction, the first position being a position of a focal point of the laser galvanometer in the first direction, and the rangefinder being at a fixed distance from the laser galvanometer in the first direction; and weld the at least two posts using the laser galvanometer, to electrically connect at least two battery cells in the battery product through a busbar.

According to the welding system in this embodiment of the present disclosure, the rangefinder in the welding device is used to perform ranging, along the first direction, of the at least two posts in the battery product to be welded, so as to obtain the set of ranging values, and the controller is used to determine the pre-weld ranging parameter for the battery product based on the set of ranging values, and then send the pre-weld ranging parameter and the parameter management-control condition used for verifying the pre-weld ranging parameter to the human-machine interface, such that the human-machine interface displays the pre-weld ranging parameter and the parameter management-control condition. In this way, a user can readily and intuitively learn of the pre-weld ranging parameter for the battery product to be welded and the parameter management-control condition corresponding to the pre-weld ranging parameter through the human-machine interface, thereby facilitating the user in performing management and control of the distance between the laser galvanometer and the post in the battery product to be welded, and thus improving the welding quality of the battery product and increasing the product yield.

In some embodiments, the welding device includes a robot, the rangefinder, and the laser galvanometer, the rangefinder and the laser galvanometer being both connected to a drive end of the robot in a driven manner; the pre-weld ranging parameter includes a first position adjustment amount for the laser galvanometer in the first direction, and the parameter management-control condition includes a first adjustment amount scope used for verifying the first position adjustment amount; and the robot is configured to: drive the rangefinder to move sequentially to ranging positions respectively corresponding to the at least two posts, to perform ranging of the at least two posts along the first direction, so as to obtain the set of ranging values; drive, based on the first position adjustment amount, the laser galvanometer to be subjected to a position adjustment in the first direction; and drive the position-adjusted laser galvanometer to move perpendicularly to the first direction, so as to weld the at least two posts.

In this way, before welding of the post, the robot drives, based on the first position adjustment amount, the laser galvanometer to be subjected to the position adjustment in the first direction, resulting in a more appropriate distance between the laser galvanometer and the post during a welding process; in addition, the first position adjustment amount and the first adjustment amount scope used for verifying the first position adjustment amount are displayed by the human-machine interface, such that a user can manage and control the first position adjustment amount based on the first adjustment amount scope, thereby increasing the precision of the position adjustment for the laser galvanometer in the first direction.

In some embodiments, the controller is further configured to: send, to the robot, a first driving instruction corresponding to a target post; send a ranging instruction to the rangefinder in response to receiving a ranging start instruction; and receive a ranging value sent by the rangefinder after the rangefinder performs ranging of each of the posts, so as to obtain the set of ranging values; the robot is further configured to: drive, in response to the first driving instruction, the rangefinder to move to a target ranging position corresponding to the target post, and send the ranging start instruction to the controller when the rangefinder reaches the target ranging position; and the rangefinder is configured to: perform, in response to the ranging instruction, ranging of the post corresponding to the current ranging position to obtain a ranging value for the post, and send the ranging value to the controller.

In this way, the controller may control, through the first driving instruction, the robot to drive the rangefinder to move to a ranging position corresponding to each post, and control, through the ranging instruction, the rangefinder to perform ranging of the post corresponding to the current ranging position, such that a control logic of the controller can be simplified through a direct communication between the controller and both the robot and rangefinder, thus increasing the ranging efficiency.

In some embodiments, the controller is further configured to: send a second driving instruction to the robot; and the robot is further configured to: drive, in response to the second driving instruction and based on the first position adjustment amount, the laser galvanometer to be subjected to the position adjustment in the first direction.

In this way, the controller can send the second driving instruction to the robot such that the position adjustment for the laser galvanometer in the first direction is quickly implemented.

In some embodiments, the controller has a signal input end, and the rangefinder has a signal output end; and the signal output end is connected to the signal input end and is used for transmitting the ranging value measured by the rangefinder to the controller via the signal input end.

In this way, the signal input end of the controller is connected to the signal output end of the rangefinder, such that the controller can quickly obtain the ranging value for the post that is measured by the rangefinder.

In some embodiments, there are a plurality of rangefinders, and the controller has a plurality of signal input ends corresponding to the plurality of rangefinders on a one-to-one basis; and each of the signal input ends is connected to a signal output end of a corresponding one of the rangefinders.

In this way, the plurality of signal input ends of the controller are connected to the signal output ends of the plurality of rangefinders in a one-to-one correspondence, such that the controller can concurrently obtain ranging values for posts that are measured by the plurality of rangefinders, thus increasing the ranging efficiency.

In some embodiments, the human-machine interface is further configured to: display the pre-weld ranging parameter in a parameter display area of a ranging management-control interface, and display the parameter management-control condition in a management-control condition display area of the ranging management-control interface.

In this way, the human-machine interface displays the pre-weld ranging parameter and the parameter management-control condition respectively in the parameter display area and the management-control condition display area of the ranging management-control interface, such that a user can view the pre-weld ranging parameter and the parameter management-control condition more clearly and intuitively.

In some embodiments, the welding system includes a plurality of welding devices, and the set of ranging values includes a subset of ranging values for at least two posts that corresponds to each of the welding devices; the controller is further configured to: determine, for each of the welding devices and based on the subset of ranging values corresponding to the welding device, a pre-weld ranging parameter corresponding to the welding device; and the human-machine interface is further configured to: display the pre-weld ranging parameter corresponding to each of the welding devices and the current effective parameter management-control condition in a ranging management-control interface corresponding to the welding device.

In this way, the human-machine interface displays the pre-weld ranging parameter corresponding to each of the welding devices and the current effective parameter management-control condition in a ranging management-control interface corresponding to the welding device, such that the pre-weld ranging parameter corresponding to each welding device can be displayed intuitively and clearly, thereby facilitating a user in managing and controlling the pre-weld ranging parameter corresponding to each welding device based on the current effective parameter management-control condition.

In some embodiments, the human-machine interface is further configured to: display a management-control condition configuration area in the ranging management-control interface; and obtain and send a configured candidate parameter management-control condition to the controller in response to receiving a configuration operation for the parameter management-control condition in the management-control condition configuration area; the controller is further configured to: update the current effective parameter management-control condition based on the candidate parameter management-control condition, to obtain a new effective parameter management-control condition; and the human-machine interface is further configured to: display the new effective parameter management-control condition in the ranging management-control interface.

In this way, the management-control condition configuration area used for configuring the parameter management-control condition is displayed, by the human-machine interface, in the ranging management-control interface, such that a user can configure the current effective parameter management-control condition according to a welding demand, thus satisfying the welding demand of the user well.

In some embodiments, the controller is further configured to: verify the pre-weld ranging parameter based on the parameter management-control condition, to obtain a verification result; send a prompt instruction to the human-machine interface if the verification result represents that the pre-weld ranging parameter does not match the parameter management-control condition; and send a welding instruction to the welding device if the verification result represents that the pre-weld ranging parameter matches the parameter management-control condition; the human-machine interface is further configured to: output prompt information in response to the prompt instruction; and the welding device is further configured to: weld the at least two posts using the laser galvanometer in response to the welding instruction.

In this way, if the verification result represents that the pre-weld ranging parameter does not match the parameter management-control condition, the controller sends the prompt instruction to the human-machine interface, so as to cause the human-machine interface to output the prompt information; in addition, if the verification result represents that the pre-weld ranging parameter matches the parameter management-control condition, the controller sends the welding instruction to the welding device, so as to cause the welding device to weld the posts using the laser galvanometer. As such, the pre-weld ranging parameter can be automatically managed and controlled using the parameter management-control condition, thus improving the welding quality of battery product.

An embodiment of the present disclosure provides a spot check method for a welding system, which is applied to a controller in the welding system, where the welding system further includes a welding device and a human-machine interface, the method including:

controlling a rangefinder in the welding device to perform ranging, along a first direction, of at least two posts in a battery product to be welded, so as to obtain a set of ranging values between the at least two posts and the rangefinder, the first direction being parallel to an optical axis of a laser galvanometer in the welding device, the rangefinder being calibrated based on a first position in the first direction, the first position being a position of a focal point of the laser galvanometer in the first direction, and the rangefinder being at a fixed distance from the laser galvanometer in the first direction;

determining a pre-weld ranging parameter for the battery product based on the set of ranging values; and controlling the human-machine interface to display the pre-weld ranging parameter and a current effective parameter management-control condition, the parameter management-control condition being used for verifying the pre-weld ranging parameter.

According to the spot check method for a welding system in this embodiment of the present disclosure, the rangefinder in the welding device is used to perform ranging, along the first direction, of the at least two posts in the battery product to be welded, so as to obtain the set of ranging values, and the controller is used to determine the pre-weld ranging parameter for the battery product based on the set of ranging values, and then send the pre-weld ranging parameter and the parameter management-control condition used for verifying the pre-weld ranging parameter to the human-machine interface, such that the human-machine interface displays the pre-weld ranging parameter and the parameter management-control condition. In this way, a user can readily and intuitively learn of the pre-weld ranging parameter for the battery product to be welded and the parameter management-control condition corresponding to the pre-weld ranging parameter through the human-machine interface, thereby facilitating the user in performing management and control of the distance between the laser galvanometer and the post in the battery product to be welded, and thus improving the welding quality of the battery product and increasing the product yield.

In some embodiments, the controlling the human-machine interface to display the pre-weld ranging parameter and a current effective parameter management-control condition includes: controlling the human-machine interface to display a ranging management-control interface, the ranging management-control interface having a parameter display area and a management-control condition display area; and controlling the human-machine interface to display the pre-weld ranging parameter in the parameter display area and to display the parameter management-control condition in the management-control condition display area.

In this way, the pre-weld ranging parameter and the parameter management-control condition are displayed, by the human-machine interface, respectively in the parameter display area and the management-control condition display area of the ranging management-control interface, such that a user can view the pre-weld ranging parameter and the parameter management-control condition more clearly and intuitively.

In some embodiments, the welding system includes a plurality of welding devices, and the set of ranging values includes a subset of ranging values for at least two posts that corresponds to each of the welding devices; the determining a pre-weld ranging parameter for the battery product based on the set of ranging values includes: determining, for each of the welding devices and based on the subset of ranging values corresponding to the welding device, a pre-weld ranging parameter corresponding to the welding device; and the controlling the human-machine interface to display the pre-weld ranging parameter and a current effective parameter management-control condition includes: controlling the human-machine interface to display the pre-weld ranging parameter corresponding to each of the welding devices and the current effective parameter management-control condition in a ranging management-control interface corresponding to the welding device.

In this way, the human-machine interface displays the pre-weld ranging parameter corresponding to each of the welding devices and the current effective parameter management-control condition in a ranging management-control interface corresponding to the welding device, such that the pre-weld ranging parameter corresponding to each welding device can be displayed intuitively and clearly, thereby facilitating a user in managing and controlling the pre-weld ranging parameter corresponding to each welding device based on the current effective parameter management-control condition.

In some embodiments, the pre-weld ranging parameter includes a first position adjustment amount for the laser galvanometer in the first direction, and the parameter management-control condition includes a first adjustment amount scope used for verifying the first position adjustment amount; and the determining a pre-weld ranging parameter for the battery product based on the set of ranging values includes: determining a first offset of a welding surface of the battery product relative to the focal point based on the set of ranging values; and determining the first position adjustment amount based on the first offset and a first defocus amount corresponding to a current welding process.

In this way, since the first offset of the welding surface of the battery product relative to the focal point of the laser galvanometer is determined based on the set of ranging values between the rangefinder and the at least two posts in the battery product, the first offset has a higher accuracy; in addition, during the process of determining the first position adjustment amount for adjusting the laser galvanometer, the first offset and the first defocus amount corresponding to the current welding process are both considered, so that a more appropriate position adjustment amount can be determined for the laser galvanometer in a welding device, resulting in a more appropriate distance between the position-adjusted laser galvanometer and the post in the battery product to be welded, thus improving the welding quality of the battery product and increasing the product yield.

In some embodiments, the determining a first offset of a welding surface of the battery product relative to the focal point based on the set of ranging values includes: determining the first offset based on a difference between a first statistical value of all ranging values in the set of ranging values and a reference distance, where the reference distance is a distance between the calibrated rangefinder and the focal point, and the first statistical value includes a midrange and/or a preset statistical quantile.

In this way, the first offset of the welding surface of the battery product relative to the focal point of the laser galvanometer can be determined more accurately based on a difference between the midrange of all the ranging values in the set of ranging values and the reference distance and/or the difference between the preset statistical quantile of all the ranging values and the reference distance.

In some embodiments, the method further includes: controlling the human-machine interface to display a management-control condition configuration area in the ranging management-control interface; obtaining a configured candidate parameter management-control condition in response to receiving a configuration operation for the parameter management-control condition by the human-machine interface in the management-control condition configuration area; updating the current effective parameter management-control condition based on the candidate parameter management-control condition, to obtain a new effective parameter management-control condition; and controlling the human-machine interface to display the new effective parameter management-control condition.

In this way, the management-control condition configuration area used for configuring the parameter management-control condition is displayed, by the human-machine interface, in the ranging management-control interface, such that a user can configure the current effective parameter management-control condition according to a welding demand, thus satisfying the welding demand of the user well.

In some embodiments, the updating the current effective parameter management-control condition based on the candidate parameter management-control condition, to obtain a new effective parameter management-control condition includes: obtaining a parameter configuration permission corresponding to a role of a current user; and determining the candidate parameter management-control condition as the new effective parameter management-control condition if the candidate parameter management-control condition matches the parameter configuration permission.

In this way, corresponding parameter configuration permissions can be set for users of different roles to facilitate management and control of the configuration of the parameter management-control condition, such that unreasonable configuration operations for the parameter management-control condition can be reduced, thereby improving the welding quality of the battery product.

In some embodiments, the method further includes: verifying the pre-weld ranging parameter based on the parameter management-control condition, to obtain a verification result; controlling the human-machine interface to output first prompt information if the verification result represents that the pre-weld ranging parameter does not match the parameter management-control condition; and sending a welding instruction to the welding device if the verification result represents that the pre-weld ranging parameter matches the parameter management-control condition, so as to cause the welding device to weld the at least two posts using the laser galvanometer.

In this way, the pre-weld ranging parameter can be automatically managed and controlled using the parameter management-control condition, thus improving the welding quality of battery product.

It should be understood that the above general descriptions and the detailed description hereinafter are merely exemplary and illustrative, and do not limit the technical solutions of the present disclosure.

BRIEF DESCRIPTION OF THE DRAWINGS

The drawings herein are incorporated into the description and form a part of the description, and these drawings illustrate the embodiments conforming to the present disclosure and are intended to explain the technical solutions of the present disclosure together with the description.

DETAILED DESCRIPTION OF EMBODIMENTS

Figure 1:
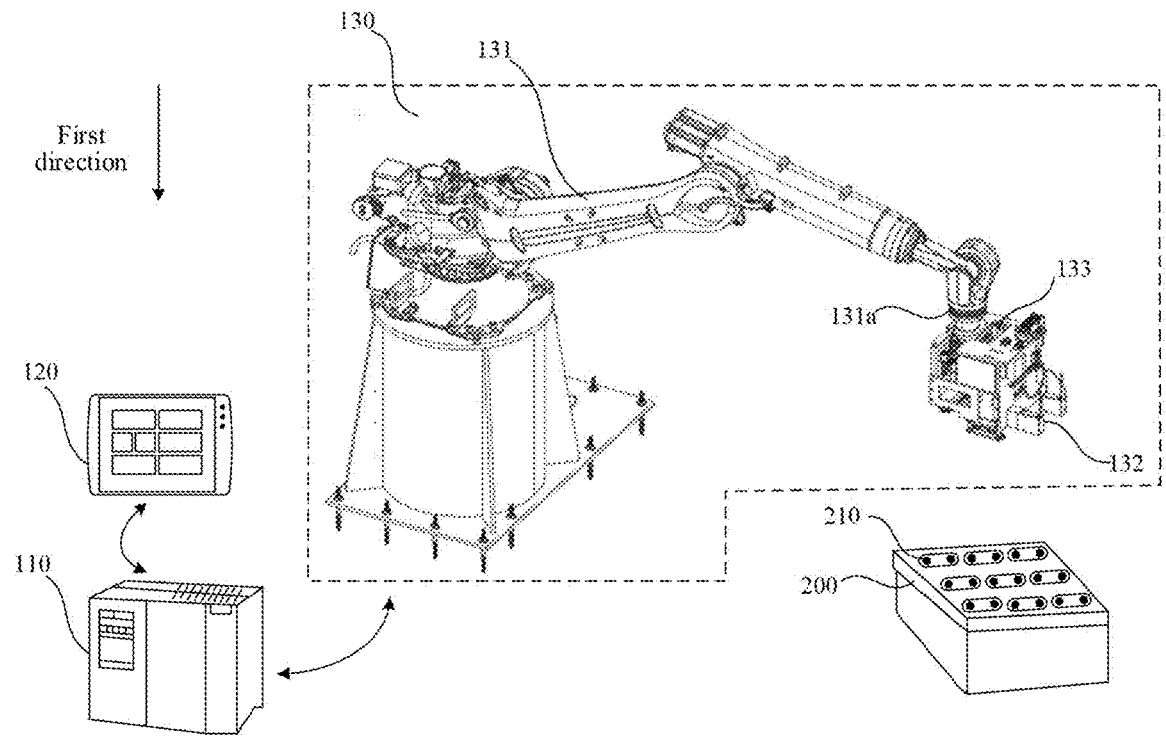
FIG. 1 is a schematic diagram of a composition structure of a welding system according to an embodiment of the present disclosure.

In order to make the purposes, technical solutions and advantages of the present disclosure clearer, the technical solutions of the present disclosure are further explained in detail below in conjunction with the accompanying drawings and embodiments, and the described embodiments shall not be regarded as limitations on the present disclosure. All other embodiments obtained by those of ordinary skill in the art without involving any inventive effort shall fall within the scope of protection of the present disclosure.

In the following description, the phrase "some embodiments" is involved, which describe a subset of all possible embodiments. However, it may be understood that the phrase "some embodiments" may be the same subset or different subsets of all the possible embodiments, and may be combined with each other without conflicts.

The terms "first/second/third" involved are only intended to distinguish between similar objects and do not represent a particular order of the objects. It may be understood that particular sequences or sequential orders indicated by the terms "first/second/third" may be interchanged if permitted, so that the embodiments of the present disclosure described herein can be implemented in an order other than that illustrated or described herein.

Unless otherwise defined, all technical and scientific terms used herein have the same meanings as those commonly understood by those skilled in the art to which the present disclosure belongs. The terms used herein are merely for the purpose of describing the present disclosure, but are not intended to limit the present disclosure.

The embodiments of the present disclosure are described in detail below.

Battery products are increasingly widely applied in life and industry. The battery products are not only used in energy storage power systems such as hydraulic power, thermal power, wind power and solar power stations, but also widely used in electric vehicles such as electric bicycles, electric motorcycles and electric automobiles and in many fields such as aerospace. With the continuous expansion of the application field of power batteries, the market demand for the power batteries is also expanding.

In the embodiments of the present disclosure, a battery may be a battery cell. The battery cell refers to a basic unit capable of implementing mutual conversion between chemical energy and electrical energy. It can be used to form a battery module or a battery pack for use in supplying power to a power consuming apparatus. The battery cell may be a secondary battery. The secondary battery refers to a battery cell of which active materials can be activated by means of charging for reuse after the battery cell is discharged. The battery cell may be a lithium ion battery, a sodium ion battery, a sodium-lithium ion battery, a lithium metal battery, a sodium metal battery, a lithium-sulfur battery, a magnesium ion battery, a nickel-metal hydride battery, a nickel-cadmium battery, a lead accumulator, etc., which is not limited in the embodiments of the present disclosure.

In a process of producing a battery product, posts of two adjacent battery cells in the battery product may be welded together through a busbar by means of a welding process, thereby implementing series and parallel electrical connections of various battery cells in the battery product. During the welding of the posts, due to an inappropriate distance between a laser galvanometer and a post in the battery product to be welded, it may lead to a poor welding quality, affecting a product yield.

An embodiment of the present disclosure provides a welding system for use in a welding operation during a process of producing a battery product. FIG. 1 is a schematic diagram of a composition structure of a welding system according to an embodiment of the present disclosure. As shown in FIG. 1, the welding system includes: a controller 110, a human-machine interface 120, and a welding device 130.

The controller 110 is configured to: determine a pre-weld ranging parameter for a battery product 200 to be welded, based on a set of ranging values between at least two posts 210 in the battery product 200 and a rangefinder 132 in the welding device 130; and send the pre-weld ranging parameter and a current effective parameter management-control condition to the human-machine interface 120, the parameter management-control condition being used for verifying the pre-weld ranging parameter.

The human-machine interface 120 is configured to: display the pre-weld ranging parameter and the parameter management-control condition.

The welding device 130 is configured to: perform ranging of the at least two posts 210 along a first direction using the rangefinder 132 in the welding device 130, to obtain the set of ranging values, the first direction being parallel to an optical axis of a laser galvanometer 133 in the welding device 130, the rangefinder 132 being calibrated based on a first position in the first direction, the first position being a position of a focal point of the laser galvanometer 133 in the first direction, and the rangefinder 132 being at a fixed distance from the laser galvanometer 133 in the first direction; and weld the at least two posts 210 using the laser galvanometer 133, to electrically connect at least two battery cells in the battery product 200 through a busbar.

Herein, the battery product 200 may include a plurality of battery cells, and each battery cell may have a positive post and a negative post. For example, the battery cell may be referred to as a cell.

In some implementations, the battery product 200 may be a battery module composed of a plurality of battery cells. For example, the battery module may be a new energy power battery module.

In some implementations, the battery product 200 may be a battery pack composed of a plurality of battery cells or battery modules. For example, the battery pack may be a new energy power battery pack.

The controller 110, the human-machine interface 120, and the welding device 130 may be in communication connection with each other. During implementation, the controller 110, the human-machine interface 120, and the welding device 130 may be in communication connection with each other via a wired network and/or a wireless network, which is not limited in the embodiments of the present disclosure.

The controller 110 may include, but is not limited to, at least one of an industrial personal computer, a programmable logic controller (PLC), etc.

The human-machine interface (HMI) 120 is a medium for human-machine interactions and information exchange. During implementation, the human-machine interface 120 may be any suitable device having a display interface through which a user can perform a human-machine interaction.

The welding device 130 may include the rangefinder 132 used to perform ranging of the posts 210 in the battery product 200 and the laser galvanometer 133 used to weld the posts 210.

During implementation, those skilled in the art may employ any appropriate rangefinder according to an actual situation, which is not limited in the embodiments of the present disclosure. In some implementations, the rangefinder 132 may be a laser rangefinder.

It may be understood that the rangefinder 132 and the laser galvanometer 133 can move synchronously in the first direction, such that the rangefinder 132 is at a fixed distance from the laser galvanometer 133 in the first direction. During implementation, the rangefinder 132 and the laser galvanometer 133 can be disposed at any appropriate position in a welding station, which is not limited in the embodiments of the present disclosure. In some implementations, the rangefinder 132 and the laser galvanometer 133, as a whole, can be connected to a drive end of a robot in the welding station in a driven manner. In some implementations, the laser galvanometer 133 may be connected to the drive end of the robot in the welding station in a driven manner, and the rangefinder 132 may include a first rangefinder disposed on a truss in the welding station and/or a second rangefinder connected to the drive end of the robot in the welding station in a driven manner.

In some implementations, the first direction may be a direction that is parallel to the optical axis of the laser galvanometer 133 and directed from the rangefinder 132 toward an upper surface of the battery product 200. For example, the rangefinder 132 and the laser galvanometer 133 are located above the battery product 200, and the first direction may be a vertical downward direction.

Prior to the ranging of the post, the rangefinder 132 can be calibrated based on the position of the focal point of the laser galvanometer 133 in the first direction. During implementation, the rangefinder 132 can be calibrated in advance using a qualified battery product, and with the focal point of the laser galvanometer 133 being aligned with a post in the qualified battery product, a distance between the post and the rangefinder 132 is measured and then used as a reference distance, i.e., a distance between the calibrated rangefinder 132 and the focal point of the laser galvanometer 133.

The pre-weld ranging parameter for the battery product 200 can be selected by a person skilled in the art according to an actual welding management-control demand, which is not limited in the embodiments of the present disclosure. During implementation, the pre-weld ranging parameter for the battery product 200 may include, but is not limited to, at least one of a first position adjustment amount for the laser galvanometer 133 in the first direction, a first offset of a welding surface of the battery product 200 relative to the focal point, a ranging value between each of at least one post and the rangefinder 132, a range of all ranging values in the set of ranging values, a respective first distance difference between each ranging value and the reference distance, etc.

The parameter management-control condition may be any appropriate condition used for verifying the pre-weld ranging parameter. For example, if the pre-weld ranging parameter includes the first position adjustment amount, the parameter management-control condition includes a first adjustment amount scope used for verifying the first position adjustment amount.

After obtaining the pre-weld ranging parameter for the battery product 200 and the current effective parameter management-control condition, the controller 110 may send the pre-weld ranging parameter and the parameter management-control condition to the human-machine interface 120 for display. During implementation, the manner in which the human-machine interface 120 displays the pre-weld ranging parameter and the parameter management-control condition is not limited. For example, the pre-weld ranging parameter and the parameter management-control condition may be displayed in the same interface, or may be separately displayed in different interfaces.

The welding device 130 allows the ranging of the at least two posts 210 to be performed by the rangefinder 132 along the first direction, so as to obtain the set of ranging values between the at least two posts and the rangefinder 132, and allows the welding of the at least two posts 210 to be performed by the laser galvanometer 133.

In some implementations, the welding device 130 may further include the robot 131. The robot 131 may be configured to drive the rangefinder 132 to move, perpendicularly to the first direction, to a ranging position corresponding to a post, and control the rangefinder 132 to perform ranging of the post along the first direction at the ranging position, so as to obtain a ranging value between the post and the rangefinder 132. As such, the set of ranging values between the at least two posts and the rangefinder 132 can be obtained by sequentially performing ranging of the at least two posts 210 in the battery product 200 to be welded. During implementation, the robot 131 may include, but is not limited to, at least one of a six-axis robot, a three-axis robot, etc.

According to the welding system in this embodiment of the present disclosure, the rangefinder in the welding device is used to perform ranging, along the first direction, of the at least two posts in the battery product to be welded, so as to obtain the set of ranging values, and the controller is used to determine the pre-weld ranging parameter for the battery product based on the set of ranging values, and then send the pre-weld ranging parameter and the parameter management-control condition used for verifying the pre-weld ranging parameter to the human-machine interface, such that the human-machine interface displays the pre-weld ranging parameter and the parameter management-control condition. In this way, a user can readily and intuitively learn of the pre-weld ranging parameter for the battery product to be welded and the parameter management-control condition corresponding to the pre-weld ranging parameter through the human-machine interface, thereby facilitating the user in performing management and control of the distance between the laser galvanometer and the post in the battery product to be welded, and thus improving the welding quality of the battery product and increasing the product yield.

In some embodiments, with continued reference to FIG. 1, the welding device 130 includes the robot 131, the rangefinder 132, and the laser galvanometer 133, the rangefinder 132 and the laser galvanometer 133 being both connected to the drive end 131a of the robot 131 in a driven manner. The pre-weld ranging parameter includes the first position adjustment amount for the laser galvanometer 133 in the first direction, and the parameter management-control condition includes the first adjustment amount scope used for verifying the first position adjustment amount.

The robot 131 is configured to drive the rangefinder 132 to move sequentially to ranging positions respectively corresponding to the at least two posts 210, to perform ranging of the at least two posts 210 along the first direction, so as to obtain the set of ranging values; drive, based on the first position adjustment amount, the laser galvanometer 133 to be subjected to a position adjustment in the first direction; and drive the position-adjusted laser galvanometer 133 to move perpendicularly to the first direction, so as to weld the at least two posts 210.

It may be understood that, the rangefinder 132 and the laser galvanometer 133, as a whole, may be connected to the drive end 131a of the robot 131 in a driven manner. In this way, the robot 131 can drive the rangefinder 132 and the laser galvanometer 133 to move synchronously.

During implementation, the controller 110 can determine the first position adjustment amount for the laser galvanometer 133 in the first direction based on the set of ranging values in any suitable manner, which is not limited in the embodiments of the present disclosure. For example, the range of all the ranging values in the set of ranging values may be determined as the first position adjustment amount. For another example, a variance of all the ranging values in the set of ranging values may be determined as the first position adjustment amount.

After determining the first position adjustment amount for the laser galvanometer 133 in the first direction, the controller 110 may send the first position adjustment amount to the robot 131. The robot 131 can drive, based on the first position adjustment amount, the laser galvanometer 133 to be subjected to the position adjustment in the first direction, so that a distance between a focal point of the position-adjusted laser galvanometer 133 and the welding surface of the battery product 200 to be welded meets the requirement of the current process. The first position adjustment amount may be a positive value, may be a negative value, or may be zero.

After driving the laser galvanometer 133 to be subjected to the position adjustment in the first direction based on the first position adjustment amount, the robot 131 may also drive the position-adjusted laser galvanometer 133 to move, perpendicularly to the first direction, to a position directly above the posts 210 of the battery product 200 to be welded, so as to weld the posts 210. It may be understood that, the position of the laser galvanometer 133 in the first direction is always kept unchanged during a process in which the robot 131 drives the position-adjusted laser galvanometer 133 to weld the at least two posts 210 in the battery product 200 to be welded.

It should be noted that, the first adjustment amount scope can be preset by a person skilled in the art according to an actual situation, which is not limited in the embodiments of the present disclosure.

In this way, before welding of the post, the robot drives, based on the first position adjustment amount, the laser galvanometer to be subjected to the position adjustment in the first direction, resulting in a more appropriate distance between the laser galvanometer and the post during a welding process; in addition, the first position adjustment amount and the first adjustment amount scope used for verifying the first position adjustment amount are displayed by the human-machine interface, such that a user can manage and control the first position adjustment amount based on the first adjustment amount scope, thereby increasing the precision of the position adjustment for the laser galvanometer in the first direction.

Figure 2:
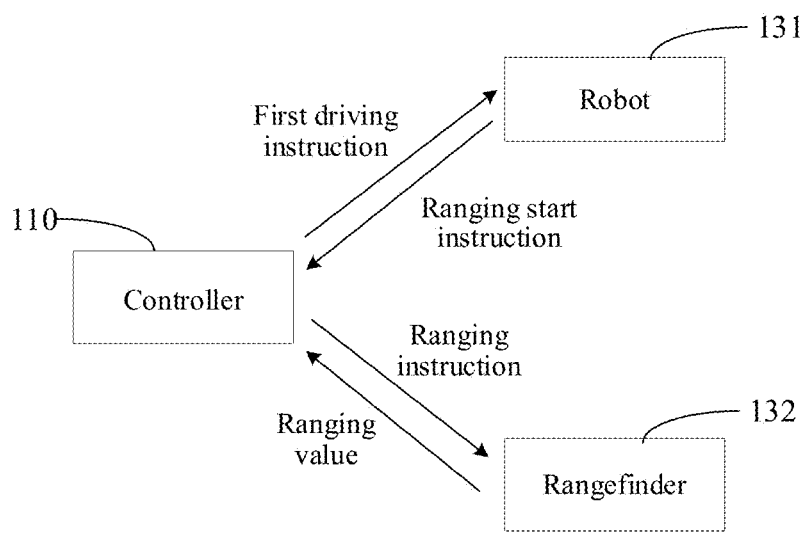
FIG. 2 is a schematic diagram of a communication interaction between a controller and both a robot and a rangefinder in a welding system during a ranging process according to an embodiment of the present disclosure.

In some embodiments, referring to FIG. 2, the controller 110 is further configured to: send, to the robot 131, a first driving instruction corresponding to a target post; send a ranging instruction to the rangefinder 132 in response to receiving a ranging start instruction; and receive a ranging value sent by the rangefinder 132 after the rangefinder performs ranging of each of the posts 210, so as to obtain the set of ranging values.

The robot 131 is further configured to: drive, in response to the first driving instruction, the rangefinder 132 to move to a target ranging position corresponding to the target post, and send the ranging start instruction to the controller 110 when the rangefinder reaches the target ranging position.

The rangefinder 132 is configured to: perform, in response to the ranging instruction, ranging of the post 210 corresponding to the current ranging position to obtain a ranging value for the post 210, and send the ranging value to the controller 110.

During implementation, the target post may be any post to be subjected to ranging in the battery product to be welded.

In this way, the controller may control, through the first driving instruction, the robot to drive the rangefinder to move to a ranging position corresponding to each post, and control, through the ranging instruction, the rangefinder to perform ranging of the post corresponding to the current ranging position, such that a control logic of the controller can be simplified through a direct communication between the controller and both the robot and rangefinder, thus increasing the ranging efficiency.

Figure 3:
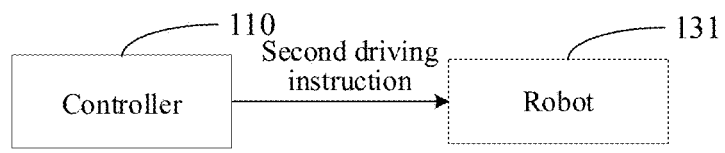
FIG. 3 is a schematic diagram of a communication interaction between a controller and a robot in a welding system during a position adjustment process for a laser galvanometer according to an embodiment of the present disclosure.

In some embodiments, referring to FIG. 3, the controller 110 is further configured to: send a second driving instruction to the robot 131.

The robot 131 is further configured to: drive, in response to the second driving instruction and based on the first position adjustment amount, the laser galvanometer 133 to be subjected to the position adjustment in the first direction.

In this way, the controller can send the second driving instruction to the robot such that the position adjustment for the laser galvanometer in the first direction is quickly implemented.

It should be noted that, the communication between the controller 110 and both the robot 131 and the rangefinder 132 and/or the laser galvanometer 133 may be implemented via a wired network, or may be implemented via a wireless network, which is not limited in the embodiments of the present disclosure. In some implementations, the controller 110 can communicate with the robot 131, the rangefinder 132, and/or the laser galvanometer 133 through an industrial Ethernet. For example, the industrial Ethernet may include an automation bus standard network (PROFINET), etc.

Figure 4:
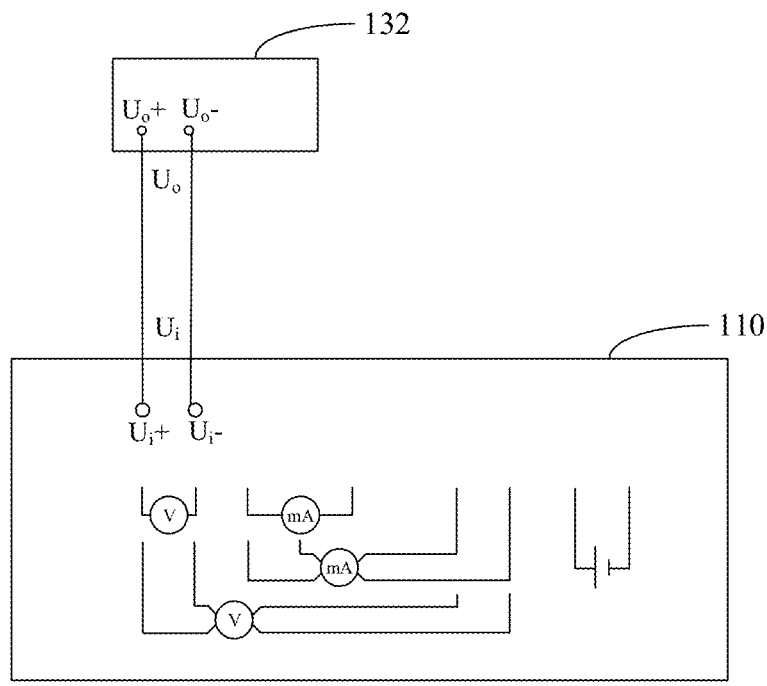
FIG. 4 is a schematic diagram of a connection between a controller and a rangefinder in a welding system according to an embodiment of the present disclosure.

In some embodiments, referring to FIG. 4, the controller 110 has a signal input end $U_i$, and the rangefinder 132 has a signal output end $U_o$.

The signal output end $U_o$ is connected to the signal input end $U_i$, and is used for transmitting the ranging value measured by the rangefinder 132 to the controller 110 via the signal input end $U_i$.

During implementation, the signal output end $U_o$ has a positive output pin $U_o+$ and a negative output pin $U_o-$; and the signal input end $U_i$ has a positive input pin $U_i+$ and a negative input pin $U_i-$.

It may be understood that, the positive output pin $U_o+$ can be connected to the positive input pin $U_i+$, and the negative output pin $U_o-$ can be connected to the negative input pin $U_i-$, so as to implement the connection between the signal output end $U_o$ and the signal input end $U_i$.

In this way, the signal input end of the controller is connected to the signal output end of the rangefinder, such that the controller can quickly obtain the ranging value for the post that is measured by the rangefinder.

In some embodiments, there are a plurality of rangefinders 132, and the controller 110 has a plurality of signal input ends $U_i$ corresponding to the plurality of rangefinders 132 on a one-to-one basis. Each of the signal input ends $U_i$ is connected to a signal output end $U_o$ of a corresponding one of the rangefinders 132.

Figure 5:
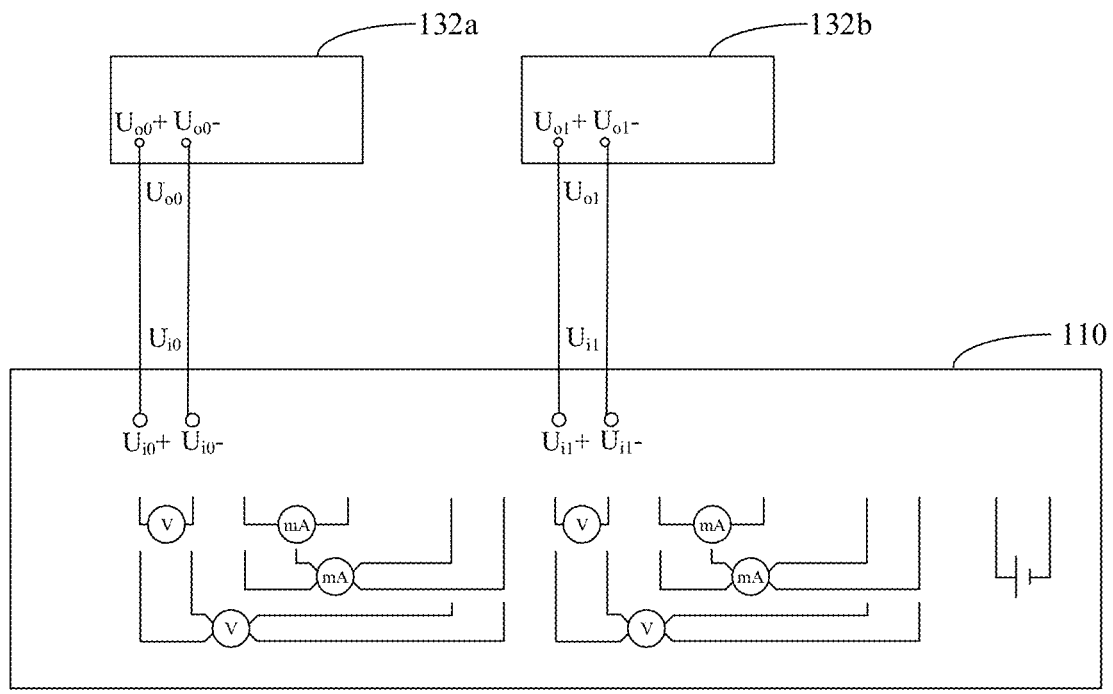
FIG. 5 is a schematic diagram of a connection between a controller and both a first rangefinder and a second rangefinder in a welding system according to an embodiment of the present disclosure.

For example, referring to FIG. 5, the welding system may include a first rangefinder 132a disposed on a truss in the welding station and a second rangefinder 132b connected to the drive end 131a of the robot 131 in a driven manner. The controller 110 has a first signal input end $U_{i0}$ and a second signal input end $U_{i1}$. The first signal input end $U_{i0}$ is connected to a first signal output end $U_{o0}$ of the first rangefinder 132a, and the second signal input end $U_{i1}$ is connected to a second signal output end $U_{o1}$ of the second rangefinder 132b. The first signal output end $U_{o0}$ has a first positive output pin $U_{o0}+$ and a first negative output pin $U_{o0}-$, and the first signal input end $U_{i0}$ has a first positive input pin $U_{i0}+$ and a first negative input pin $U_{i0}-$. The second signal output end $U_{o1}$ has a second positive output pin $U_{o1}+$ and a second negative output pin $U_{o1}-$, and the second signal input end $U_{i1}$ has a second positive input pin $U_{i1}+$ and a second negative input pin $U_{i1}-$.

In the above embodiment, the plurality of signal input ends of the controller are connected to the signal output ends of the plurality of rangefinders in a one-to-one correspondence, such that the controller can concurrently obtain ranging values for posts that are measured by the plurality of rangefinders, thus increasing the ranging efficiency.

Figure 6:
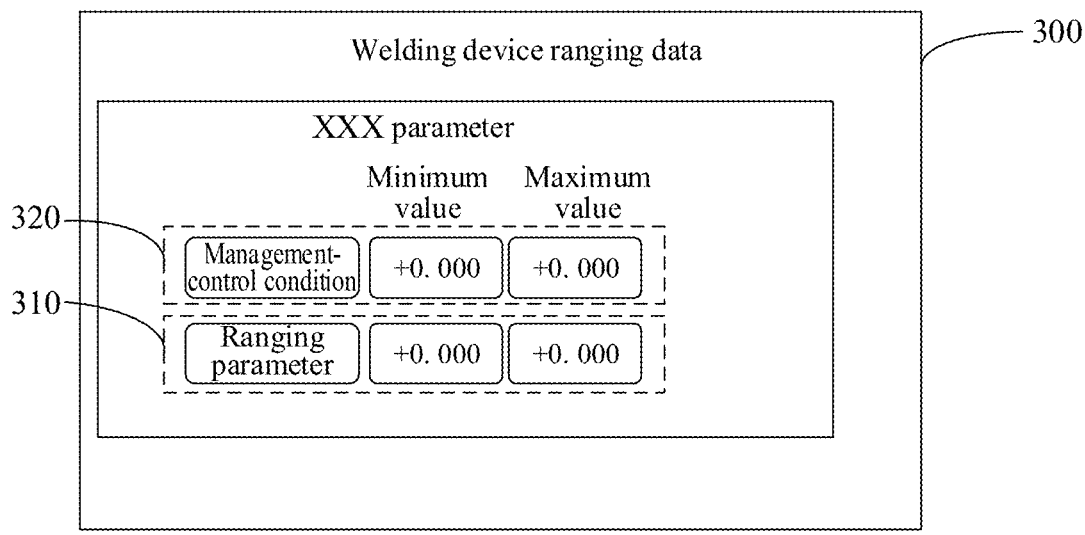
FIG. 6 is a schematic diagram I of display of a ranging management-control interface according to an embodiment of the present disclosure.

In some embodiments, referring to FIG. 6, the human-machine interface 120 is further configured to: display the pre-weld ranging parameter in a parameter display area 310 of a ranging management-control interface 300, and display the parameter management-control condition in a management-control condition display area 320 of the ranging management-control interface 300.

In this way, the human-machine interface displays the pre-weld ranging parameter and the parameter management-control condition respectively in the parameter display area and the management-control condition display area of the ranging management-control interface, such that a user can view the pre-weld ranging parameter and the parameter management-control condition more clearly and intuitively.

In some embodiments, the welding system includes a plurality of welding devices 130, and the set of ranging values includes a subset of ranging values for at least two posts 210 that corresponds to each of the welding devices 130.

The controller 110 is further configured to: determine, for each of the welding devices 130 and based on the subset of ranging values corresponding to the welding device 130, a pre-weld ranging parameter corresponding to the welding device 130.

The human-machine interface 120 is further configured to: display the pre-weld ranging parameter corresponding to each of the welding devices 130 and the current effective parameter management-control condition in a ranging management-control interface 300 corresponding to the welding device 130.

It may be understood that, the posts 210 in the battery product 200 may be welded by the plurality of welding devices 130 in the welding system. Each welding device 130 may correspond to at least two posts 210 in the battery product 200, and each welding device 130 is used to weld the corresponding at least two posts 210.

Each welding device 130 may also correspond to one ranging management-control interface 300, and the human-machine interface 120 may display the pre-weld ranging parameter corresponding to the welding device 130 and the current effective parameter management-control condition in the ranging management-control interface 300 corresponding to the welding device 130. During implementation, the human-machine interface 120 may simultaneously display, on a display screen, ranging management-control interfaces 300 respectively corresponding to the plurality of welding devices 130, or may display, in a switching manner, the plurality of ranging management-control interfaces 300 by means of interface switching, which is not limited in the embodiments of the present disclosure.

Figure 7:
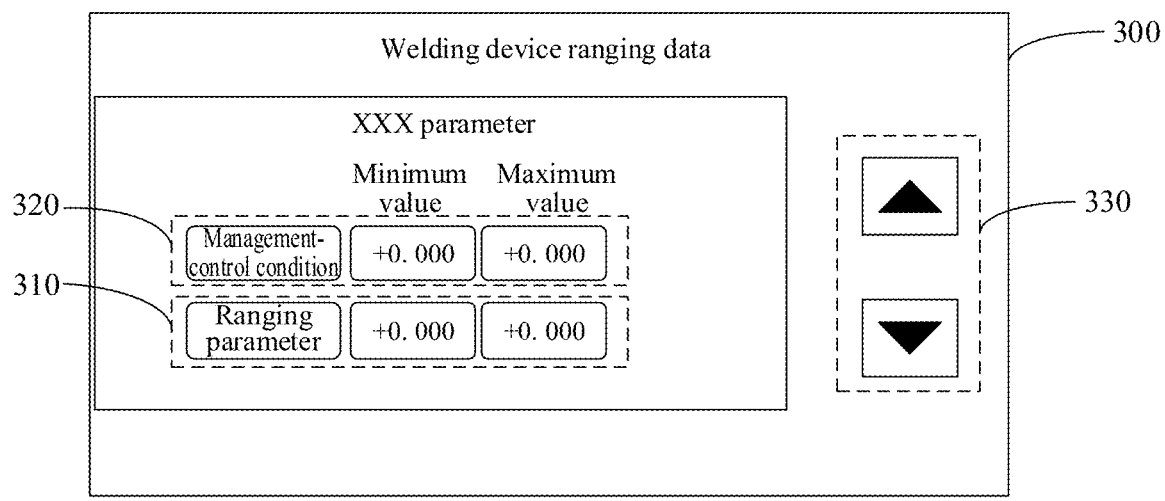
FIG. 7 is a schematic diagram II of display of a ranging management-control interface according to an embodiment of the present disclosure.

For example, referring to FIG. 7, the human-machine interface 120 may display the pre-weld ranging parameter corresponding to the welding device 130 (referring to FIG. 1) and the current effective parameter management-control condition in the ranging management-control interface 300 corresponding to the welding device 130. Additionally, the human-machine interface 120 may also switch, in response to a trigger operation for an interface switching control 330 in the ranging management-control interface 300, to display a ranging management-control interface corresponding to another welding device.

In this way, the human-machine interface displays the pre-weld ranging parameter corresponding to each of the welding devices and the current effective parameter management-control condition in a ranging management-control interface corresponding to the welding device, such that the pre-weld ranging parameter corresponding to each welding device can be displayed intuitively and clearly, thereby facilitating a user in managing and controlling the pre-weld ranging parameter corresponding to each welding device based on the current effective parameter management-control condition.

Figure 8:
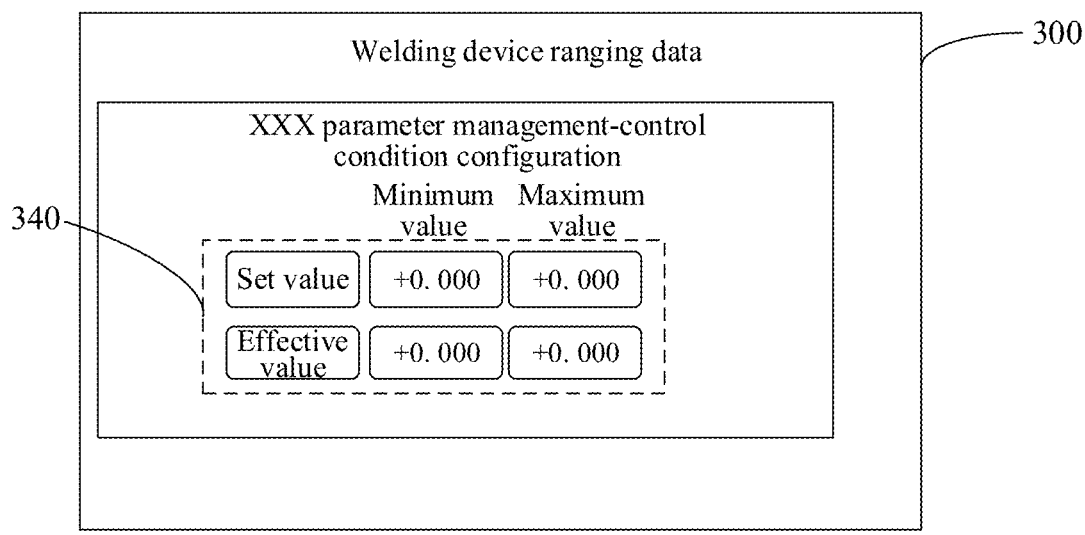
FIG. 8 is a schematic diagram III of display of a ranging management-control interface according to an embodiment of the present disclosure.

In some embodiments, referring to FIG. 8, the human-machine interface 120 is further configured to: display a management-control condition configuration area 340 in the ranging management-control interface 300; and obtain and send a configured candidate parameter management-control condition to the controller 110 in response to receiving a configuration operation for the parameter management-control condition in the management-control condition configuration area 340. The controller 110 is further configured to: update the current effective parameter management-control condition based on the candidate parameter management-control condition, to obtain a new effective parameter management-control condition. The human-machine interface 120 is further configured to: display the new effective parameter management-control condition in the ranging management-control interface 300.

In some implementations, the management-control condition configuration area and the management-control condition display area may be the same area, that is, the user can configure the parameter management-control condition in the management-control condition display area.

In some implementations, the management-control condition configuration area and the management-control condition display area are two separate areas for display in the ranging management-control interface 300.

In this way, the management-control condition configuration area used for configuring the parameter management-control condition is displayed, by the human-machine interface, in the ranging management-control interface, such that a user can configure the current effective parameter management-control condition according to a welding demand, thus satisfying the welding demand of the user well.

In some embodiments, the controller 110 is further configured to: verify the pre-weld ranging parameter based on the parameter management-control condition, to obtain a verification result; send a prompt instruction to the human-machine interface 120 if the verification result represents that the pre-weld ranging parameter does not match the parameter management-control condition; and send a welding instruction to the welding device 130 if the verification result represents that the pre-weld ranging parameter matches the parameter management-control condition.

The human-machine interface 120 is further configured to: output prompt information in response to the prompt instruction.

The welding device 130 is further configured to: weld the at least two posts 210 using the laser galvanometer 133 in response to the welding instruction.

The prompt information may be any appropriate information for providing an operator with a prompt that the pre-weld ranging parameter for the current battery product 200 to be welded does not meet the parameter management-control condition. During implementation, the prompt information may include at least one of text information, voice information, an alert ringtone, an alert icon, etc., which is not limited in the embodiments of the present disclosure.

After being informed of the prompt information, the operator may perform a manual intervention to check whether there is a large deviation in a placement position of the battery product 200 to be welded and/or the battery cell in the battery product 200, or to make a manual adjustment to the placement position of the battery product 200 to be welded and/or the battery cell in the battery product 200, etc., until a pre-weld ranging parameter determined after the adjustment meets the parameter management-control condition, and then the controller 110 sends the welding instruction to the welding device 130.

In this way, if the verification result represents that the pre-weld ranging parameter does not match the parameter management-control condition, the controller sends the prompt instruction to the human-machine interface, so as to cause the human-machine interface to output the prompt information; in addition, if the verification result represents that the pre-weld ranging parameter matches the parameter management-control condition, the controller sends the welding instruction to the welding device, so as to cause the welding device to weld the posts using the laser galvanometer. As such, the pre-weld ranging parameter can be automatically managed and controlled using the parameter management-control condition, thus improving the welding quality of battery product.

Based on the above welding system provided in this embodiment of the present disclosure, an embodiment of the present disclosure provides a spot check method for a welding system, which method can be performed by the controller 110 in the welding system. During implementation, the controller 110 may be, for example, an industrial personal computer, a programmable logic controller (PLC), etc. In some implementations, the controller 110 may include a processor and a memory storing instructions executable by the processor, where the instruction, when executed by the processor, cause the controller to implement the spot check method for a welding system.

Figure 9:
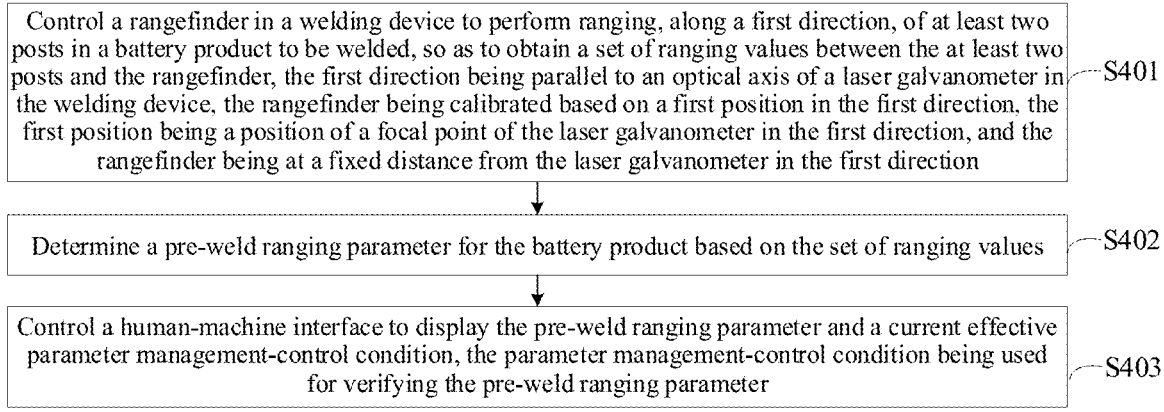
FIG. 9 is a schematic diagram I of an implementation process of a spot check method for a welding system according to an embodiment of the present disclosure.

FIG. 9 is a schematic diagram I of an implementation process of a spot check method for a welding system according to an embodiment of the present disclosure. As shown in FIG. 9, the method may include steps S401 to S403 below.

Step S401: Control a rangefinder in the welding device to perform ranging, along a first direction, of at least two posts in a battery product to be welded, so as to obtain a set of ranging values between the at least two posts and the rangefinder, the first direction being parallel to an optical axis of a laser galvanometer in the welding device, the rangefinder being calibrated based on a first position in the first direction, the first position being a position of a focal point of the laser galvanometer in the first direction, and the rangefinder being at a fixed distance from the laser galvanometer in the first direction.

Step S402: Determine a pre-weld ranging parameter for the battery product based on the set of ranging values.

Step S403: Control a human-machine interface to display the pre-weld ranging parameter and a current effective parameter management-control condition, the parameter management-control condition being used for verifying the pre-weld ranging parameter.

According to the spot check method for a welding system in this embodiment of the present disclosure, the rangefinder in the welding device is used to perform ranging, along the first direction, of the at least two posts in the battery product to be welded, so as to obtain the set of ranging values, and the controller is used to determine the pre-weld ranging parameter for the battery product based on the set of ranging values, and then send the pre-weld ranging parameter and the parameter management-control condition used for verifying the pre-weld ranging parameter to the human-machine interface, such that the human-machine interface displays the pre-weld ranging parameter and the parameter management-control condition. In this way, a user can readily and intuitively learn of the pre-weld ranging parameter for the battery product to be welded and the parameter management-control condition corresponding to the pre-weld ranging parameter through the human-machine interface, thereby facilitating the user in performing management and control of the distance between the laser galvanometer and the post in the battery product to be welded, and thus improving the welding quality of the battery product and increasing the product yield.

In some embodiments, step S403 above may include steps S411 and S412 below.

Step S411: Control the human-machine interface to display a ranging management-control interface, the ranging management-control interface having a parameter display area and a management-control condition display area.

Step S412: Display the pre-weld ranging parameter in the parameter display area and display the parameter management-control condition in the management-control condition display area.

In this way, the pre-weld ranging parameter and the parameter management-control condition are displayed, by the human-machine interface, respectively in the parameter display area and the management-control condition display area of the ranging management-control interface, such that a user can view the pre-weld ranging parameter and the parameter management-control condition more clearly and intuitively.

In some embodiments, the welding system includes a plurality of welding devices, and the set of ranging values includes a subset of ranging values for at least two posts that corresponds to each of the welding devices.

Step S402 above may include: determining, for each of the welding devices and based on the subset of ranging values corresponding to the welding device, a pre-weld ranging parameter corresponding to the welding device.

Step S403 above may include: controlling the human-machine interface to display the pre-weld ranging parameter corresponding to each of the welding devices and the current effective parameter management-control condition in a ranging management-control interface corresponding to the welding device.

In this way, the pre-weld ranging parameter corresponding to each of the welding devices and the current effective parameter management-control condition are displayed, by the human-machine interface, in the ranging management-control interface corresponding to the welding device, such that the pre-weld ranging parameter corresponding to each welding device can be displayed intuitively and clearly, thereby facilitating a user in managing and controlling the pre-weld ranging parameter corresponding to the welding device based on the current effective parameter management-control condition.

In some embodiments, the pre-weld ranging parameter includes a first position adjustment amount for the laser galvanometer in the first direction, and the parameter management-control condition includes a first adjustment amount scope used for verifying the first position adjustment amount. Step S402 above may include steps S421 and S422 below.

Step S421: Determine a first offset of a welding surface of the battery product relative to the focal point based on the set of ranging values.

Step S422: Determine the first position adjustment amount based on the first offset and a first defocus amount corresponding to a current welding process.

During implementation, the first offset of the welding surface of the battery product relative to the focal point can be determined based on the set of ranging values in any suitable manner, which is not limited in the embodiments of the present disclosure. The welding surface of the battery product refers to a plane formed by an upper end of each post in the battery product. As there may be a height difference between the posts in the battery product, and the battery product itself may also be tilted, the welding surface of the battery product may have a certain first offset relative to the focal point of the laser galvanometer. The first offset of the welding surface of the battery product relative to the focal point may be estimated based on the set of ranging values for the at least two posts in the battery product, so as to obtain the estimated first offset.

The first defocus amount corresponding to the current process refers to a distance between the focal point of the laser galvanometer and the welding surface of the battery product to be welded that is required to meet a requirement of the current process. During implementation, the first defocus amount corresponding to the current process can be preset according to an actual situation, which is not limited in the embodiments of the present disclosure.

In some implementations, the first position adjustment amount for the laser galvanometer in the first direction can be determined based on a difference between the first defocus amount and the first offset.

In the above embodiment, the first offset of the welding surface of the battery product relative to the focal point is determined based on the set of ranging values; and the first position adjustment amount for the laser galvanometer in the first direction is determined based on the first offset and the first defocus amount corresponding to the current welding process. In this way, since the first offset of the welding surface of the battery product relative to the focal point of the laser galvanometer is determined based on the set of ranging values between the rangefinder and the at least two posts in the battery product, the first offset has a higher accuracy; in addition, during the process of determining the first position adjustment amount for adjusting the laser galvanometer, the first offset and the first defocus amount corresponding to the current welding process are both considered, so that a more appropriate position adjustment amount can be determined for the laser galvanometer in a welding device, resulting in a more appropriate distance between the position-adjusted laser galvanometer and the post in the battery product to be welded, thus improving the welding quality of the battery product and increasing the product yield.

In some embodiments, step S421 above may include: determining the first offset based on a difference between a first statistical value of all ranging values in the set of ranging values and a reference distance, where the reference distance is a distance between the calibrated rangefinder and the focal point, and the first statistical value includes a midrange and/or a preset statistical quantile.

The preset statistical quantile may include, but is not limited to, a quartile, a quintile, or an octile, etc. The midrange refers to a value obtained by averaging a maximum value and a minimum value.

In this way, the first offset of the welding surface of the battery product relative to the focal point of the laser galvanometer can be determined more accurately based on a difference between the midrange of all the ranging values in the set of ranging values and the reference distance and/or the difference between the preset statistical quantile of all the ranging values and the reference distance.

In some embodiments, the pre-weld ranging parameter further includes a distance adjustment difference of the laser galvanometer in the first direction, and the parameter management-control condition further includes an adjustment difference scope used for verifying the distance adjustment difference. The method may further include steps S431 to S433 below.

Step S431: Control the rangefinder to perform ranging of a preset ranging point, to obtain a first ranging value.

Step S432: Control a robot in the welding device to drive, based on the first position adjustment amount, the laser galvanometer to be subjected to a position adjustment in the first direction.

Step S433: Control, after the position adjustment of the laser galvanometer in the first direction, the rangefinder to perform ranging of the preset ranging point, to obtain a second ranging value.

Step S402 above may further include steps S434 and S435 below.

Step S434: Determine a second position adjustment amount based on a difference between the second ranging value and the first ranging value.

Step S435: Determine the distance adjustment difference based on a difference between the second position adjustment amount and the first position adjustment amount.

It may be understood that, there may be a control error in the process in which the robot drives the laser galvanometer to be subjected to the position adjustment in the first direction based on the first position adjustment amount, resulting in an adjustment difference between the first position adjustment amount and an actual amount of movement of the laser galvanometer in the first direction that is caused by the position adjustment.

The preset ranging point may be a ranging point that is fixed in a welding station. The first ranging value is obtained by the rangefinder through the ranging, along the first direction, of the preset ranging point before the position adjustment of the laser galvanometer in the first direction, the second ranging value is obtained by the rangefinder through the ranging, along the first direction, of the preset ranging point after the position adjustment of the laser galvanometer in the first direction, and the second position adjustment amount is determined based on the difference between the second ranging value and the first ranging value. Therefore, the second position adjustment amount can represent an actual amount of movement of the rangefinder in the first direction that is caused by the position adjustment of the laser galvanometer in the first direction. In addition, since the rangefinder is at a fixed distance from the laser galvanometer in the first direction, the second position adjustment amount also represents the actual amount of movement of the laser galvanometer in the first direction that is caused by the position adjustment of the laser galvanometer in the first direction. Thus, a difference between the second position adjustment amount and the first position adjustment amount can represent the adjustment difference between the first position adjustment amount and the actual amount of movement of the laser galvanometer in the first direction that is caused by the position adjustment of the laser galvanometer in the first direction. In this way, fool-proofing management and control of the adjustment difference may be implemented using the adjustment difference scope, thereby further improving the welding quality of the battery product.

In some embodiments, the pre-weld ranging parameter further includes a second distance difference corresponding to each ranging value in the set of ranging values, and the parameter management-control condition further includes a second distance difference scope used for verifying the second distance difference. Step S402 above may further include steps S441 and S442 below.

Step S441: Determine a first distance difference between each ranging value in the set of ranging values and the reference distance, the reference distance being a distance between the calibrated rangefinder and the focal point.

Step S442: Determine a sum of the first distance difference corresponding to the ranging value and the second position adjustment amount to be the second distance difference corresponding to the ranging value.

The first distance difference for a post is a distance difference between the ranging value corresponding to the post and the reference distance, i.e., a theoretical distance offset of the post relative to the focal point of the laser galvanometer. In addition, a difference between the second position adjustment amount and the first position adjustment amount can represent the adjustment difference between the first position adjustment amount and the actual amount of movement of the laser galvanometer in the first direction that is caused by the position adjustment of the laser galvanometer in the first direction. Thus, the sum of the first distance difference for a post and the second position adjustment amount can represent an actual distance offset of the post relative to the focal point of the laser galvanometer.

In this way, fool-proofing management and control of the actual distance offset corresponding to each post may be implemented using the second distance difference scope, thereby further improving the welding quality of the battery product.

During implementation, the adjustment difference scope and the second distance difference scope can both be preset by those skilled in the art according to an actual situation, which are not limited in the embodiments of the present disclosure.

In some implementations, the adjustment difference scope is ±0.2 millimeters (mm).

In some embodiments, the pre-weld ranging parameter further includes a second defocus amount, and the parameter management-control condition further includes a defocus amount scope used for verifying the second defocus amount. Step S402 above may further include: determining the second defocus amount based on a sum of the second position adjustment amount and the first offset.

Herein, since the second position adjustment amount represents an actual amount of movement of the laser galvanometer in the first direction that is caused by the position adjustment of the laser galvanometer in the first direction, the sum of the second position adjustment amount and the first offset can represent an actual offset of the welding surface of the battery product relative to the focal point after the position adjustment of the laser galvanometer in the first direction, i.e., the second defocus amount. In this way, fool-proofing management and control of the second defocus amount may be implemented using the defocus amount scope, thereby further improving the welding quality of the battery product.

During implementation, the defocus amount scope can be preset by those skilled in the art according to an actual situation, which is not limited in the embodiments of the present disclosure.

In some embodiments, the pre-weld ranging parameter may further include at least one of the following: the first offset, a ranging value between each of at least one post and the rangefinder, a ranging range, and the first distance difference. Step S402 above may further include at least one of the operations below.

Step S451: Determine the ranging value between each of at least one post and the rangefinder from the set of ranging values.

Step S452: Determine the ranging range based on the range of all the ranging values in the set of ranging values.

Step S453: Determine a first distance difference between each of the ranging values in the set of ranging values and the reference distance, the reference distance being the distance between the calibrated rangefinder and the focal point of the laser galvanometer.

In some implementations, if the pre-weld ranging parameter includes the first offset, the parameter management-control condition further includes a first offset scope used for verifying the first offset. The first offset matches the first offset scope if the first offset is within the first offset scope.

In some implementations, if the pre-weld ranging parameter includes the ranging value for at least one post, the parameter management-control condition further includes a first ranging value scope used for verifying the ranging value. The ranging value matches the first ranging value scope if the ranging value is within the first ranging value scope.

In some implementations, if the pre-weld ranging parameter includes the ranging range, the parameter management-control condition further includes a range scope used for verifying the ranging range. The ranging range matches the range scope if the ranging range is within the range scope.

In some implementations, if the pre-weld ranging parameter includes the first distance difference, the parameter management-control condition further includes a first distance difference scope used for verifying the first distance difference. The first distance difference matches the first distance difference scope if the first distance difference is within the first distance difference scope.

During implementation, the above range scope, first ranging value scope, first distance difference scope, and first offset scope can all be preset by a person skilled in the art according to an actual situation, which are not limited in the embodiments of the present disclosure.

In some embodiments, the method may further include steps S461 to S464 below.

Step S461: Control the human-machine interface to display a management-control condition configuration area in the ranging management-control interface.

Step S462: Obtain a configured candidate parameter management-control condition in response to receiving a configuration operation for the parameter management-control condition by the human-machine interface in the management-control condition configuration area.

Step S463: Update the current effective parameter management-control condition based on the candidate parameter management-control condition, to obtain a new effective parameter management-control condition.

Step S464: Control the human-machine interface to display the new effective parameter management-control condition.

In this way, the management-control condition configuration area used for configuring the parameter management-control condition is displayed, by the human-machine interface, in the ranging management-control interface, such that a user can configure the current effective parameter management-control condition according to a welding demand, thus satisfying the welding demand of the user well.

In some embodiments, step S463 above may include steps S471 and S472 below.

Step S471: Obtain a parameter configuration permission corresponding to a role of a current user.

Step S472: Determine the candidate parameter management-control condition as the new effective parameter management-control condition if the candidate parameter management-control condition matches the parameter configuration permission.

Herein, respective roles may be allocated to users in advance, and a corresponding parameter configuration permission may be set for each role. During implementation, the role corresponding to each user, and the parameter configuration permission corresponding to each role can be preset according to an actual situation, which are not limited in the embodiments of the present disclosure.

For example, the pre-weld ranging parameter includes the first position adjustment amount for the laser galvanometer in the first direction, and the parameter management-control condition includes the first adjustment amount scope used for verifying the first position adjustment amount. A first parameter configuration permission may be set for a common user, for example, the first adjustment amount scope corresponding to the first parameter configuration permission may be configured as ±0.2 mm; and a second parameter configuration permission may be set for an advanced user, for example, the first adjustment amount scope corresponding to the second parameter configuration permission may be configured as ±0.5 mm.

In some implementations, an administrator role may be set up, and a user of the administrator role can change the parameter configuration permission corresponding to each role.

In this way, corresponding parameter configuration permissions can be set for users of different roles to facilitate management and control of the configuration of the parameter management-control condition, such that unreasonable configuration operations for the parameter management-control condition can be reduced, thereby improving the welding quality of the battery product.

In some embodiments, step S463 above may further include: sustaining the current effective parameter management-control condition if the candidate parameter management-control condition does not match the parameter configuration permission. In other words, if a candidate parameter management-control condition configured by a user is beyond the parameter configuration permission, the candidate parameter management-control condition is invalid.

In some embodiments, the method may further include steps S481 to S483 below.

Step S481: Verify the pre-weld ranging parameter based on the parameter management-control condition, to obtain a verification result.

Step S482: Control the human-machine interface to output prompt information if the verification result represents that the pre-weld ranging parameter does not match the parameter management-control condition.

Step S483: Send a welding instruction to the welding device if the verification result represents that the pre-weld ranging parameter matches the parameter management-control condition, so as to cause the welding device to weld the at least two posts using the laser galvanometer.

In this way, the pre-weld ranging parameter can be automatically managed and controlled using the parameter management-control condition, thus improving the welding quality of battery product.

The application of the embodiments of the present disclosure in an actual scenario is described below.

Figure 10:
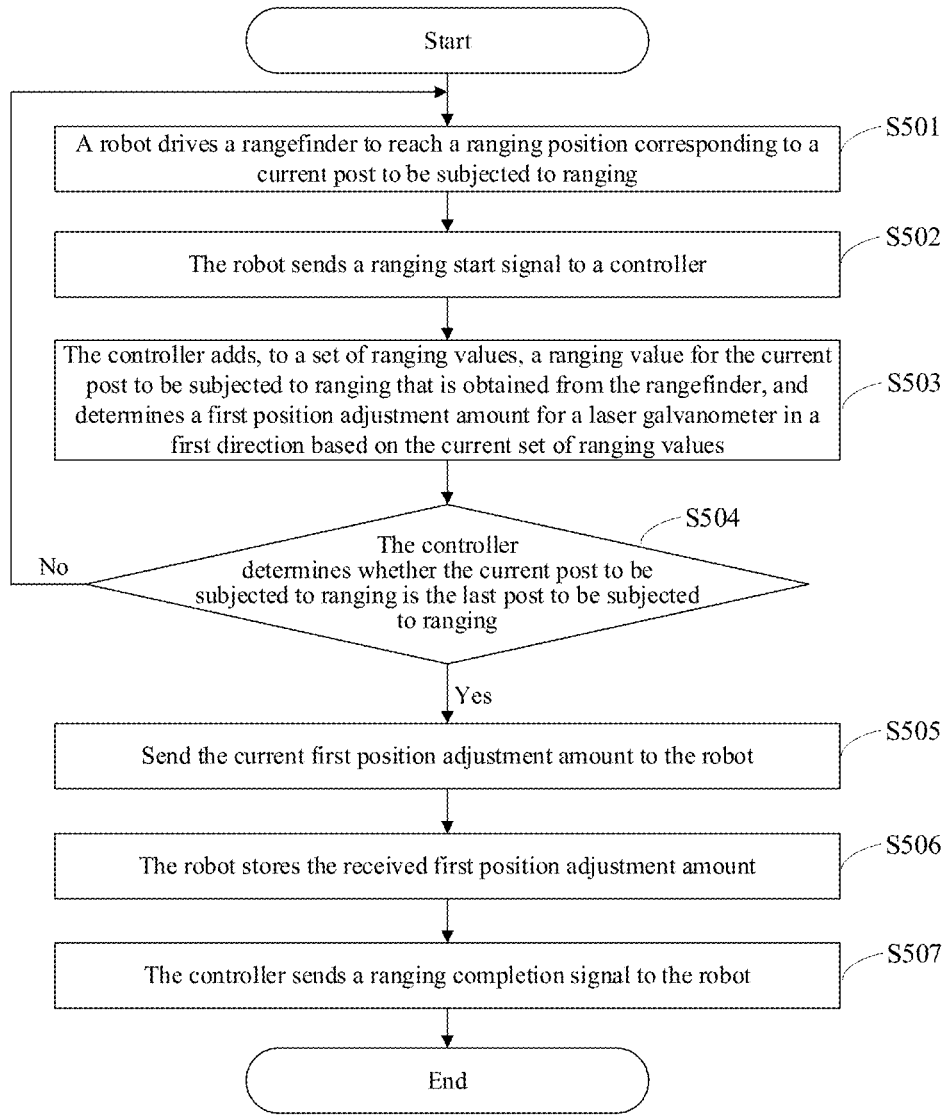
FIG. 10 is a schematic diagram II of an implementation process of a spot check method for a welding system according to an embodiment of the present disclosure.

The embodiments of the present disclosure provide a spot check method for a welding system. FIG. 10 is a schematic diagram II of an implementation process of a spot check method for a welding system according to an embodiment of the present disclosure. As shown in FIG. 10, the method may include steps S501 to S507 below.

Step S501: A robot drives a rangefinder to reach a ranging position corresponding to a current post to be subjected to ranging.

Step S502: The robot sends a ranging start signal to a controller.

Step S503: The controller adds, to a set of ranging values, a ranging value for the current post to be subjected to ranging that is obtained from the rangefinder, and determines a first position adjustment amount for a laser galvanometer in a first direction based on the current set of ranging values.

Step S504: The controller determines whether the current post to be subjected to ranging is the last post to be subjected to ranging; if so, the process proceeds to step S505; otherwise, a next post to be subjected to ranging is used as the current post to be subjected to ranging, and the process returns to step S501.

Step S505: Send the current first position adjustment amount to the robot.

Step S506: The robot stores the received first position adjustment amount.

Step S507: The controller sends a ranging completion signal to the robot.

In this way, the ranging of at least two posts in the battery product to be welded can be implemented efficiently, and the first position adjustment amount for the laser galvanometer in the first direction can be determined quickly, thereby improving the welding efficiency of the battery product.

It should be noted herein that the above descriptions of the embodiments tend to emphasize differences between the embodiments, and for the same or similar parts of the embodiments, reference may be made between the embodiments.

It should be understood that, the phrase "one embodiment" or "an embodiment" mentioned throughout the description means that particular features, structures, or characteristics related to the embodiment are included in at least one embodiment of the present disclosure. Therefore, the phrase "in one embodiment" or "in an embodiment" presented everywhere throughout the description does not necessarily refer to the same embodiment. Furthermore, these particular features, structures, or characteristics may be combined into one or more embodiments in any suitable manner. It should be understood that, in the embodiments of the present disclosure, sequence numbers of the foregoing steps/processes do not indicate an execution sequence. The execution sequence of the steps/processes should be determined according to functions and internal logic of the steps/processes, and should not be construed as any limitation on the implementation processes of the embodiments of the present disclosure. The sequence numbers of the above embodiments of the present disclosure are only for description, and do not represent the superiority or inferiority of the embodiments.

It should be noted that, the term "comprise", "include" or any other variant thereof herein is intended to cover a non-exclusive inclusion, so that a process, method, article, or apparatus that includes a series of elements not only includes these elements, but also includes other elements not explicitly listed, or elements that are inherent to such a process, method, article, or apparatus. In the absence of more restrictions, an element defined by a phrase "including one . . . " does not exclude the presence of other identical elements in a process, method, article, or apparatus that includes the element.

In the several embodiments provided in the present disclosure, it should be understood that the disclosed device and method may be implemented in other manners. The device embodiments described above are merely illustrative. For example, the division of the units is only a logical functional division, and during practical implementation, there may be another manner for division. For instance: a plurality of units or components may be combined or integrated into another system, or some features may be ignored or not performed. In addition, the displayed or discussed mutual couplings or direct couplings or communication connections between various constituent parts may be implemented through some interfaces. The indirect couplings or communication connections between devices or units may be implemented in electrical, mechanical, or other forms.

The above units described as separate components may or may not be physically separated. The components shown as units may or may not be physical units. They may be located in one place, or may be distributed over a plurality of network units. Some or all of the units may be selected according to actual requirements to achieve the objectives of the solutions of the embodiments. In addition, all functional units in the embodiments of the present disclosure may be integrated into one processing unit, or each unit may separately serve as one unit, or two or more units may be integrated into one unit. The above integrated unit may be implemented in a form of hardware, or may be implemented in a form of hardware plus a software functional unit.

The above descriptions are merely the implementations of the present disclosure, and the scope of protection of the present disclosure is not limited thereto. Variations or replacements that may be readily conceived by any person skilled in the art within the technical scope disclosed in the present disclosure shall fall within the scope of protection of the present disclosure.

INDUSTRIAL APPLICABILITY

According to the welding system in this embodiment of the present disclosure, the rangefinder in the welding device is used to perform ranging, along the first direction, of the at least two posts in the battery product to be welded, so as to obtain the set of ranging values, and the controller is used to determine the pre-weld ranging parameter for the battery product based on the set of ranging values, and then send the pre-weld ranging parameter and the parameter management-control condition used for verifying the pre-weld ranging parameter to the human-machine interface, such that the human-machine interface displays the pre-weld ranging parameter and the parameter management-control condition. In this way, a user can readily and intuitively learn of the pre-weld ranging parameter for the battery product to be welded and the parameter management-control condition corresponding to the pre-weld ranging parameter through the human-machine interface, thereby facilitating the user in performing management and control of the distance between the laser galvanometer and the post in the battery product to be welded, and thus improving the welding quality of the battery product and increasing the product yield.

What is claimed is:

1. A welding system, comprising a controller, a human-machine interface, and at least one welding device, wherein the controller is configured to: determine a pre-weld ranging parameter for a battery product to be welded, based on a set of ranging values between at least two posts in the battery product and a rangefinder in the at least one welding device; and send the pre-weld ranging parameter and a current effective parameter management-control condition to the human-machine interface, the parameter management-control condition being used for verifying the pre-weld ranging parameter;

the human-machine interface is configured to: display the pre-weld ranging parameter and the parameter management-control condition; and the at least one welding device is configured to: perform ranging of the at least two posts along a first direction using the rangefinder, to obtain the set of ranging values, the first direction being parallel to an optical axis of a laser galvanometer in the at least one welding device, the rangefinder being calibrated based on a first position in the first direction, the first position being a position of a focal point of the laser galvanometer in the first direction, and the rangefinder being at a fixed distance from the laser galvanometer in the first direction; and weld the at least two posts using the laser galvanometer, to electrically connect at least two battery cells in the battery product through a busbar, the at least one welding device comprises a robot, the rangefinder, and the laser galvanometer, the rangefinder and the laser galvanometer being both connected to a drive end of the robot in a driven manner; the pre-weld ranging parameter comprises a first position adjustment amount for the laser galvanometer in the first direction, and the parameter management-control condition comprises a first adjustment amount scope used for verifying the first position adjustment amount; and the robot is configured to: drive the rangefinder to move sequentially to ranging positions respectively corresponding to the at least two posts, to perform ranging of the at least two posts along the first direction, so as to obtain the set of ranging values; drive, based on the first position adjustment amount, the laser galvanometer to be subjected to a position adjustment in the first direction; and drive the position-adjusted laser galvanometer to move perpendicularly to the first direction, so as to weld the at least two posts.

2. The welding system according to claim 1, wherein the controller is further configured to: send, to the robot, a first driving instruction corresponding to a target post; send a ranging instruction to the rangefinder in response to receiving a ranging start instruction; and receive a ranging value sent by the rangefinder after the rangefinder performs ranging of each of the posts, so as to obtain the set of ranging values;

the robot is further configured to: drive, in response to the first driving instruction, the rangefinder to move to a target ranging position corresponding to the target post, and send the ranging start instruction to the controller when the rangefinder reaches the target ranging position; and the rangefinder is configured to: perform, in response to the ranging instruction, ranging of the post corresponding to the current ranging position to obtain a ranging value for the post, and send the ranging value to the controller.

3. The welding system according to claim 2, wherein the controller is further configured to: send a second driving instruction to the robot; and the robot is further configured to: drive, in response to the second driving instruction and based on the first position adjustment amount, the laser galvanometer to be subjected to the position adjustment in the first direction.

4. The welding system according to claim 1, wherein the controller has a signal input end, and the rangefinder has a signal output end; and
the signal output end is connected to the signal input end and is used for transmitting the ranging value measured by the rangefinder to the controller via the signal input end.

5. The welding system according to claim 4, wherein there are a plurality of rangefinders, and the controller has a plurality of signal input ends corresponding to the plurality of rangefinders on a one-to-one basis; and each of the signal input ends is connected to a signal output end of a corresponding one of the rangefinders.

6. The welding system according to claim 1, wherein
the human-machine interface is further configured to: display the pre-weld ranging parameter in a parameter display area of a ranging management-control interface, and display the parameter management-control condition in a management-control condition display area of the ranging management-control interface.

7. The welding system according to claim 1, wherein the at least one welding device comprises a plurality of welding devices, and the set of ranging values comprises a subset of ranging values for at least two posts that corresponds to each of the welding devices;
the controller is further configured to: determine, for each of the plurality of welding devices and based on the subset of ranging values corresponding to the welding device, a pre-weld ranging parameter corresponding to the welding device; and
the human-machine interface is further configured to: display the pre-weld ranging parameter corresponding to each of the plurality of welding devices and the current effective parameter management-control condition in a ranging management-control interface corresponding to the welding device.

8. The welding system according to claim 1, wherein
the human-machine interface is further configured to: display a management-control condition configuration area in a ranging management-control interface; and obtain and send a configured candidate parameter management-control condition to the controller in response to receiving a configuration operation for the parameter management-control condition in the management-control condition configuration area;
the controller is further configured to: update the current effective parameter management-control condition based on the candidate parameter management-control condition, to obtain a new effective parameter management-control condition; and
the human-machine interface is further configured to: display the new effective parameter management-control condition in the ranging management-control interface.

9. The welding system according to claim 1, wherein
the controller is further configured to: verify the pre-weld ranging parameter based on the parameter management-control condition, to obtain a verification result; send a prompt instruction to the human-machine interface if the verification result represents that the pre-weld ranging parameter does not match the parameter management-control condition; and send a welding instruction to the at least one welding device if the verification result represents that the pre-weld ranging parameter matches the parameter management-control condition;
the human-machine interface is further configured to: output prompt information in response to the prompt instruction; and
the at least one welding device is further configured to: weld the at least two posts using the laser galvanometer in response to the welding instruction.

10. A spot check method for a welding system, which is applied to a controller in the welding system, wherein the welding system further comprises at least one welding device and a human-machine interface, the method comprising:
controlling a rangefinder in the at least one welding device to perform ranging, along a first direction, of at least two posts in a battery product to be welded, so as to obtain a set of ranging values between the at least two posts and the rangefinder, the first direction being parallel to an optical axis of a laser galvanometer in the at least one welding device, the rangefinder being calibrated based on a first position in the first direction, the first position being a position of a focal point of the laser galvanometer in the first direction, and the rangefinder being at a fixed distance from the laser galvanometer in the first direction;
determining a pre-weld ranging parameter for the battery product based on the set of ranging values;
controlling the human-machine interface to display the pre-weld ranging parameter and a current effective parameter management-control condition, the parameter management-control condition being used for verifying the pre-weld ranging parameter,
verifying the pre-weld ranging parameter based on the parameter management-control condition, to obtain a verification result;
controlling the human-machine interface to output prompt information if the verification result represents that the pre-weld ranging parameter does not match the parameter management-control condition; and
sending a welding instruction to the at least one welding device if the verification result represents that the pre-weld ranging parameter matches the parameter management-control condition, so as to cause the at least one welding device to weld the at least two posts using the laser galvanometer.

11. The spot check method according to claim 10, wherein
the controlling the human-machine interface to display the pre-weld ranging parameter and a current effective parameter management-control condition comprises:
controlling the human-machine interface to display a ranging management-control interface, the ranging management-control interface having a parameter display area and a management-control condition display area; and
controlling the human-machine interface to display the pre-weld ranging parameter in the parameter display area and to display the parameter management-control condition in the management-control condition display area.

12. The spot check method according to claim 10, wherein the at least one welding device comprises a plurality of welding devices, and the set of ranging values comprises a subset of ranging values for at least two posts that corresponds to each of the plurality of welding devices;

the determining a pre-weld ranging parameter for the battery product based on the set of ranging values comprises:
  determining, for each of the plurality of welding devices and based on the subset of ranging values corresponding to the welding device, a pre-weld ranging parameter corresponding to the welding device; and
the controlling the human-machine interface to display the pre-weld ranging parameter and a current effective parameter management-control condition comprises:
  controlling the human-machine interface to display the pre-weld ranging parameter corresponding to each of the plurality of welding devices and the current effective parameter management-control condition in a ranging management-control interface corresponding to the welding device.

13. The spot check method according to claim 10, wherein the pre-weld ranging parameter comprises a first position adjustment amount for the laser galvanometer in the first direction, and the parameter management-control condition comprises a first adjustment amount scope used for verifying the first position adjustment amount; and
  the determining a pre-weld ranging parameter for the battery product based on the set of ranging values comprises:
  determining a first offset of a welding surface of the battery product relative to the focal point based on the set of ranging values; and
  determining the first position adjustment amount based on the first offset and a first defocus amount corresponding to a current welding process.

14. The spot check method according to claim 13, wherein the determining a first offset of a welding surface of the battery product relative to the focal point based on the set of ranging values comprises:
  determining the first offset based on a difference between a first statistical value of all ranging values in the set of ranging values and a reference distance, wherein the reference distance is a distance between the calibrated rangefinder and the focal point, and the first statistical value comprises a midrange and/or a preset statistical quantile.

15. The spot check method according to claim 10, wherein the method further comprises:
  controlling the human-machine interface to display a management-control condition configuration area in a ranging management-control interface;
  obtaining a configured candidate parameter management-control condition in response to receiving a configuration operation for the parameter management-control condition by the human-machine interface in the management-control condition configuration area;
  updating the current effective parameter management-control condition based on the candidate parameter management-control condition, to obtain a new effective parameter management-control condition; and
  controlling the human-machine interface to display the new effective parameter management-control condition.

16. The spot check method according to claim 15, wherein the updating the current effective parameter management-control condition based on the candidate parameter management-control condition, to obtain a new effective parameter management-control condition comprises:
  obtaining a parameter configuration permission corresponding to a role of a current user; and
  determining the candidate parameter management-control condition as the new effective parameter management-control condition if the candidate parameter management-control condition matches the parameter configuration permission.

17. A welding system, comprising a controller, a human-machine interface, and at least one welding device, wherein
  the controller is configured to: determine a pre-weld ranging parameter for a battery product to be welded, based on a set of ranging values between at least two posts in the battery product and a rangefinder in the at least one welding device; and send the pre-weld ranging parameter and a current effective parameter management-control condition to the human-machine interface, the parameter management-control condition being used for verifying the pre-weld ranging parameter;
  the human-machine interface is configured to: display the pre-weld ranging parameter and the parameter management-control condition;
  the at least one welding device is configured to: perform ranging of the at least two posts along a first direction using the rangefinder, to obtain the set of ranging values, the first direction being parallel to an optical axis of a laser galvanometer in the at least one welding device, the rangefinder being calibrated based on a first position in the first direction, the first position being a position of a focal point of the laser galvanometer in the first direction, and the rangefinder being at a fixed distance from the laser galvanometer in the first direction; and weld the at least two posts using the laser galvanometer, to electrically connect at least two battery cells in the battery product through a busbar,
  the at least one welding device comprises a plurality of welding devices, and the set of ranging values comprises a subset of ranging values for at least two posts that corresponds to each of the plurality of welding devices;
  the controller is further configured to: determine, for each of the plurality of welding devices and based on the subset of ranging values corresponding to the welding device, a pre-weld ranging parameter corresponding to the welding device; and
  the human-machine interface is further configured to: display the pre-weld ranging parameter corresponding to each of the plurality of welding devices and the current effective parameter management-control condition in a ranging management-control interface corresponding to the welding device.

18. The welding system according to claim 17, wherein the human-machine interface is further configured to: display a management-control condition configuration area in a ranging management-control interface; and obtain and send a configured candidate parameter management-control condition to the controller in response to receiving a configuration operation for the parameter management-control condition in the management-control condition configuration area;
  the controller is further configured to: update the current effective parameter management-control condition based on the candidate parameter management-control condition, to obtain a new effective parameter management-control condition; and
  the human-machine interface is further configured to: display the new effective parameter management-control condition in the ranging management-control interface.

19. The welding system according to claim 17, wherein
the controller is further configured to: verify the pre-weld
ranging parameter based on the parameter management-control condition, to obtain a verification result;
send a prompt instruction to the human-machine interface if the verification result represents that the pre-weld ranging parameter does not match the parameter management-control condition; and send a welding instruction to the at least one welding device if the verification result represents that the pre-weld ranging parameter matches the parameter management-control condition;

the human-machine interface is further configured to:
output prompt information in response to the prompt instruction; and the at least one welding device is further configured to:
weld the at least two posts using the laser galvanometer in response to the welding instruction.

20. The welding system according to claim 17, wherein
the human-machine interface is further configured to:
display the pre-weld ranging parameter in a parameter display area of a ranging management-control interface, and display the parameter management-control condition in a management-control condition display area of the ranging management-control interface.

* * * * *